Patented Aug. 21, 1945

2,382,951

UNITED STATES PATENT OFFICE 2,382,951

MANUFACTURE OF CATALYSTS

Jacob Elston Ahlberg and Charles L. Thomas, Chicago, Ill., assignors to Universal Oil Products Company, Chicago, Ill., a corporation of Delaware No Drawing. Application August 30, 1941,
Serial No. 408,998

4 Claims. (Cl. 252—254)

This is a continuation-in-part of our co-pending application Serial No. 360,124, filed October 7, 1940, which in turn is a continuation-in-part of our application Serial No. 132,091, filed March 20, 1937.

This invention relates to the manufacture of catalysts suitable for accelerating reactions among hydrocarbons.

More specifically it has reference to the manufacture of granular refractory catalytic materials which are particularly effective in selectively promoting the formation of gasoline boiling range liquids from relatively heavy petroleum fractions.

The art of cracking relatively heavy hydrocarbons to produce primarily gasoline or gas is very extensive and it is recognized that most of the basic principles of hydrocarbon decomposition are known and that particular commercial processes have been developed which embody these principles. The application of catalysts, however, in hydrocarbon reactions is practically upon the same basis as it is in other fields, that is, there is much more to be learned about them. A large number of the catalysts developed for cracking have a tendency to accelerate reactions leading to the formation of gas rather than of gasoline, this being particularly evidenced by reduced metal catalysts such as nickel or iron and many of such catalysts are sensitive to sulfur poisoning and are quickly coated with carbonaceous materials which render them practically inert. This deposition of carbonaceous materials is many times related to the type of decomposition reactions selectively fostered by the catalyst.

The present invention is concerned with the manufacture of catalytic materials which are specially adapted to use in the pyrolysis of heavy fractions of petroleum and other hydrocarbonaceous materials to increase the rate of production of gasoline-boiling range fractions. The catalysts are characterized by selectivity in accelerating gasoline-forming reactions rather than the gas-forming reactions, by their selectivity in producing high antiknock gasoline, by their refractory character which enables them to retain their catalytic properties under severe conditions of temperature and pressure, by their ease and simplicity of manufacture and by their exact reproducibility.

In one specific embodiment the present invention comprises the manufacture of catalysts suitable for use in hydrocarbon reactions by the co-precipitation of hydrated aluminum oxide and hydrated silicon dioxide in the presence of ammonium hydroxide to form hydrated alumina-silica masses, washing said masses to remove soluble materials and heating to volatilize ammonia and remove a portion of their water content.

Extensive experiments have indicated that effective cracking catalysts both from the standpoint of activity and selectivity in producing gasoline rather than gas are produced by precipitating hydrated alumina and hydrated silica simultaneously from aqueous solutions containing ammonium hydroxide or to which ammonium hydroxide is added after precipitation. It has been found that the presence of ammonium hydroxide in definite amounts minimizes the amounts of alkali metal salts present in the co-precipitated composites of hydrated alumina and hydrated silica. We have previously determined that synthetically prepared composites of silica-alumina which are free from alkali metals are active and at the same time stable cracking catalysts. The improvement in stability is evidently due to the fact that sintering or fusion does not occur under conditions of service and reactivation when sodium compounds or other alkali metal compounds are absent from such prepared composites.

When silica-alumina composites are made by co-precipitation reactions such as occur when solutions of salts of aluminum such as the chloride or sulfate are added to solutions of alkali metal silicates, synthetic zeolites of the general type $Na_2O:Al_2O_3:xSiO_2 \cdot yH_2O$ are formed, which contain alkali metal compounds from the starting materials. It is characteristic of these synthetic zeolites that not all of the $Na_2O$ is base exchangeable. Thus synthetic zeolites of the alkali metal-silica-alumina type contain at least two readily distinguishable types of alkali metal compounds, that is, base exchangeable compounds and non-base exchangeable compounds, and, therefore, only a part of the alkali metal compounds can be replaced by base exchange with ammonium ions. Such a product is usually a catalyst for cracking reactions but at the same time it is of inferior activity during initial periods of use in cracking and of greatly inferior stability at the relatively high temperatures employed in reactivation periods wherein carbon deposits are burned off after a period of service.

When co-precipitation of silica and alumina hydrogels is carried out in the presence of considerable ammonia or ammonium ions, the synthetic zeolites formed contain definite quantities of ammonium compounds as well as alkali metal compounds. The formula of zeolites precipitated in the presence of ammonium salts can be written as follows:

$$(1-a)Na_2O \cdot a(NH_4) \cdot Al_2O_3 \cdot XSiO_2 \cdot yH_2O$$

In these cases the relative amounts of $Na_2O$ and $NH_4$ can be controlled to a considerable extent by regulating the concentration of ammonia in the aqueous medium in which the precipitation occurs. It is furthermore to be noted that most of the remaining $Na_2O$ in alkali metal zeolites is base exchangeable so that the final product is in essence an ammonium zeolite which when heated loses ammonia and leaves an essentially alkali metal free silica-alumina mass of high activity and good stability as indicated in catalytic cracking service.

Although it is usually preferable to have ammonia or ammonium ions present during coprecipitation, similar effects in regard to the production of stable alkali metal free composites are obtainable if the ammonia is added immediately after a mixing of the interacting reagents, i. e. the aqueous solution of alkali metal silicate and aluminum salt. Similarly the required amount of ammonia can be added to the alkali metal silicate solution, to the aluminum salt solution or to both solutions before they are mixed.

As a rule good catalysts of the present type are produced when approximately molecular equivalents of silica and alumina are precipitated which yield after washing, drying and further heating under suitable conditions mixtures corresponding to the approximate formula $Al_2O_3 \cdot SiO_2 \cdot nH_2O$, the amount of combined water varying with the conditions of drying. However, the proportions of alumina to silica can be varied in either direction to produce, for example, mixtures having the approximate formulas $2Al_2O_3 \cdot SiO_2 \cdot nH_2O$ or $Al_2O_3 \cdot 2SiO_2 \cdot nH_2O$.

The wet product from the operations of the above described character may be processed in several ways to make a finished catalyst as follows:

1. It may be extruded and cut into desired shapes and sizes, with due allowance for shrinkage, after which it may be dried and finally calcined to drive off ammonia and combined water. In most cases a mild preliminary drying should be applied before the extrusion step.
2. The wet product may be dried until it has a moisture content of about 15 to 20% after which it may be pelleted and calcined.
3. It may be dried to a cake and sized into granules suitable for fixed bed operations or to the size desired for powdered catalytic hydrocarbon conversion operations such as, for example, catalytic cracking. The final calcination to remove ammonia and part of the combined water may be then effected.

The catalytic activity and selectivity will vary with the relative proportions of hydrated alumina and hydrated silica which have been used during their joint precipitation and this variation in properties is utilizable when selecting catalysts for particular decomposition reactions. For example, one proportion may be better for use in reforming a certain gasoline boiling range material, another may be better for use in the cracking of a gas-oil distillate and still another may be better adapted to cracking still heavier fractions.

The alumina compounds employed may alternatively include the aluminates in which the alumina is present in the acid radical. In this case the type of reactions of precipitation may be represented as:

$$2NaAlO_2 + 2Na_2O \cdot 3SiO_2 \cdot zH_2O + aNH_4Cl =$$
$$\left(\frac{6-a}{2}\right)Na_2O \cdot a(NH_4) \cdot Al_2O_3 \cdot 6SiO_2 \cdot yH_2O + aNaCl$$

The primary hydrated precipitates are of a somewhat gelatinous character and may be washed from adhering soluble materials by decantation or filtration methods. After a final washing the precipitate is recovered as a filter cake by using any known type of suction or pressure filter and is then heated to a temperature of the order of 300° F. for a period of 36–48 hours after which it may be ground and sized to recover particles of a convenient average diameter or formed into any desired shapes by compression methods. It has been found that drying at 300° F. produces material having a total water content of from about 15% to 25% by weight which as already stated apparently corresponds to the best workability of the material for pelleting. In service at cracking temperatures of the order of approximately 850–1000° F., a further dehydration occurs so that for example after a considerable period of heating at 900° F., the water content as determined by analysis is of the order of 2–3% which is firmly fixed.

If desired, small amounts of salts of various heavy metals may be added to the aqueous menstruum in which the original precipitation is carried out so that the catalyst ultimately produced contains small proportions of promoting substances. The use of these materials is optional, however, and whether they are used will depend upon the exact character of the reaction for which the catalyst is being prepared.

Catalysts prepared by the described procedure evidently possess a large total contact surface corresponding evidently to a high porosity, the pores being of such size that hydrocarbon oil vapors are able to penetrate to a considerable distance and yet not so small that when the pores become clogged with carbonaceous deposits after a long period of service, they are difficult to reactivate by oxidation. It is noticeable that extremely small pores seem to favor coke formation, medium size pores appear to be catalytically active over long periods of time while large pores generally indicate inactive material and do not foster coke formation. The typical structure is also retained after many alternate periods of use and reactivation as evidenced by the fact that catalysts may be reactivated and reused for long periods of time.

The following example is submitted to show a specific instance of the preparation and use of the present type of catalyst:

A solution consisting of 85.3 parts by weight of sodium silicate having the formula $$Na_2SiO_3 \cdot 9H_2O$$

dissolved in 400 parts by weight of water, was slowly added to a solution consisting of 145 parts by weight of aluminum chloride hexa-hydrate having the formula $AlCl_3 \cdot 6H_2O$ dissolved in 400 parts by weight of water. To the mixture 100 parts by weight of concentrated ammonium hydroxide solution was then added and then 700 parts by weight of water after which the reaction products were allowed to stand at room temperature for 18 hours. The final pH was 7.8. The precipitate was filtered and then washed with 5 washes of 600 parts by weight of water each. The washed precipitate was finally dried at 300° F. for 36 hours and formed into small cylindrical pellets by the use of a pilling machine. The dried catalyst was practically sodium-free since it contained only 0.14% sodium.

The catalyst particles thus prepared were used as filter in a tube through which vapors of a paraffinic gas-oil were passed at a temperature of 900° F. and atmospheric pressure. The volume of liquid change per volume of catalyst space per hour was maintained at 1. There was produced a yield of 56% by volume of 80 octane number gasoline without the addition of liquid polymers produced from the gaseous olefins. A life test was conducted on this catalyst and it was found after 100 regenerations, regenerating at temperatures up to approximately 1400° F. and having produced gasoline at the rate of 177 gallons of 400° F. end-point gasoline per pound of catalyst, that there was no drop in octane number and the yield of gasoline only decreased from an average of 28.9 per cent for the first processing periods to an average of 26.4 per cent for the last 24 periods.

We claim as our invention:

1. A process of catalyst manufacture which comprises conjointly precipitating hydrated silica and hydrated alumina by commingling aqueous solutions of an aluminum compound, an alkali metal silicate and an ammonium compound, the ammonium compound being in sufficient amount to provide in the mixture an ammonium ion concentration greater than the alkali metal ion concentration of said mixture, separating and washing the resultant silica-alumina precipitate and heating the latter to expel ammonia.

2. A process of catalyst manufacture which comprises conjointly precipitating hydrated silica and hydrated alumina by commingling aqueous solutions of an aluminum salt, an alkali metal silicate and ammonium hydroxide, the ammonium hydroxide being in sufficient amount to provide in the mixture an ammonium ion concentration greater than the alkali metal ion concentration of said mixture, separating and washing the resultant silica-alumina precipitate and heating the latter to expel ammonia.

3. The process as defined in claim 1 further characterized in that said aluminum compound and silicate solutions are first commingled with each other and said ammonium compound then added to the mixed solution.

4. The process as defined in claim 2 further characterized in that said aluminum salt and silicate solutions are first commingled with each other and the ammonium hydroxide then added to the mixed solution.

JACOB ELSTON AHLBERG.
CHARLES L. THOMAS.